US012784519B1

(12) United States Patent
Bach et al.

(10) Patent No.: US 12,784,519 B1
(45) Date of Patent: Nov. 3, 2026

(54) MODULAR AUTOMOTIVE DIAGNOSTIC PLATFORM WITH PROGRESSIVE FEATURE UNLOCKING

(71) Applicant: Innova Electronics Corporation, Irvine, CA (US)

(72) Inventors: Ly Bach, Ho Chi Minh City (VN); Phuong Pham, Fountain Valley, CA (US); Keith Andreasen, Garden Grove, CA (US); Benjamin Pham, Fountain Valley, CA (US); Yenni Giang, Westminster, CA (US); Vo Thi Hong Nhi, Ho Chi Minh City (VN); Khanh Le, Ho Chi Minh City (VN); Suong Nguyen, Dak Lak (VN); Le Huu Thai, Ho Chi Minh City (VN)

(73) Assignee: Innova Electronics Corporation, Irvine, CA (US)

( * ) Notice: Subject to any disclaimer, the term of this patent is extended or adjusted under 35 U.S.C. 154(b) by 0 days.

(21) Appl. No.: 19/293,366

(22) Filed: Aug. 7, 2025

(51) Int. Cl.
*G07C 5/08* (2006.01)
*B60W 50/02* (2012.01)
(Continued)

(52) U.S. Cl.
CPC ........... *G07C 5/0825* (2013.01); *G07C 5/008* (2013.01); *H04L 63/08* (2013.01);
(Continued)

(58) Field of Classification Search
CPC .. G07C 5/0825; G07C 5/008; G07C 2205/02; H04L 63/08; B60W 50/0205;
(Continued)

(56) References Cited

U.S. PATENT DOCUMENTS 9,117,319 B2 * 8/2015 Chen .................... G07C 5/0808
10,163,281 B2 * 12/2018 Le .......................... G07C 5/008
(Continued)

FOREIGN PATENT DOCUMENTS

CN 119576618 A * 3/2025 ......... G06F 3/04817

OTHER PUBLICATIONS

Translation of CN119576618 (Year: 2025).*

*Primary Examiner* — Fadey S. Jabr
*Assistant Examiner* — Ashutosh Pande
(74) *Attorney, Agent, or Firm* — Stetina Garred Brucker & Newboles

(57) ABSTRACT

A diagnostic tool system and method employ a multi-tiered access architecture to control automotive diagnostic functionality that may be based on user role and credential authentication. The tool supports at least three operational modes: a basic Inspection/Service Mode, a non-invasive Enhanced Inspection Mode, and a Full Diagnostic Mode with advanced, high-risk functions such as ECU programming and actuator control. Access to Full Diagnostic Mode is gated through cloud-verified credentials, with sensitive features provisioned only after successful authentication. The system may include a dynamic mode recommendation engine, context-aware restrictions based on vehicle data, and modular software provisioning to enhance security and usability. This architecture allows a single tool to serve both entry-level users and professional technicians while minimizing the risk of improper vehicle interaction.

26 Claims, 7 Drawing Sheets

(51) Int. Cl.

| | |
|---|---|
| ***G06F 8/65*** | (2018.01) |
| ***G07C 5/00*** | (2006.01) |
| ***H04L 9/40*** | (2022.01) |
| *B60W 50/00* | (2006.01) |

(52) U.S. Cl.
CPC . *B60W 2050/0083* (2013.01); *B60W 50/0205* (2013.01); *B60W 2050/0215* (2013.01); *B60W 2556/45* (2020.02); *G06F 8/65* (2013.01); *G07C 2205/02* (2013.01)

(58) Field of Classification Search
CPC . B60W 2050/0083; B60W 2050/0215; B60W 2556/45; G06F 8/65
See application file for complete search history.

(56) References Cited

U.S. PATENT DOCUMENTS

| | | | | |
|---|---|---|---|---|
| 11,257,307 | B1 * | 2/2022 | Herron | G07C 5/0808 |
| 12,112,587 | B1 * | 10/2024 | Huynh | G07C 5/0808 |
| 12,361,772 | B1 * | 7/2025 | Herron | G07C 5/0808 |
| 12,380,747 | B1 * | 8/2025 | Herron | G07C 5/0808 |
| 2004/0227523 | A1 | 11/2004 | Namaky | |
| 2005/0043868 | A1 * | 2/2005 | Mitcham | G07C 5/0858 701/31.4 |
| 2005/0096805 | A1 * | 5/2005 | Fudali | G07C 5/008 701/31.4 |
| 2005/0143882 | A1 * | 6/2005 | Umezawa | G07C 5/008 701/31.4 |
| 2006/0161390 | A1 | 7/2006 | Namaky | |
| 2007/0156313 | A1 * | 7/2007 | Fudali | G07C 5/008 701/2 |
| 2008/0071439 | A1 | 3/2008 | Bertosa | |
| 2012/0046807 | A1 * | 2/2012 | Ruther | B60R 25/24 701/2 |
| 2016/0225198 | A1 * | 8/2016 | Punjabi | H04W 84/18 |
| 2017/0084087 | A1 | 3/2017 | Liu | |
| 2017/0305368 | A1 * | 10/2017 | Markham | B60R 16/0231 |
| 2020/0211302 | A1 * | 7/2020 | Wang | G07C 5/008 |
| 2021/0035390 | A1 * | 2/2021 | Determann | G07C 9/00857 |
| 2022/0027963 | A1 | 1/2022 | Isaac | |
| 2022/0173971 | A1 * | 6/2022 | Fang | H04L 63/0236 |
| 2023/0252824 | A1 * | 8/2023 | Merg | G07C 5/006 701/29.4 |
| 2024/0046717 | A1 * | 2/2024 | Sequino | H04L 67/12 |
| 2024/0144746 | A1 * | 5/2024 | Zizzadoro | B60R 25/24 |
| 2024/0412572 | A1 * | 12/2024 | Sequino | G07C 5/008 |
| 2025/0193181 | A1 * | 6/2025 | Thambidurai | H04L 63/18 |
| 2025/0371919 | A1 * | 12/2025 | O'Mahony | G07C 5/0808 |

* cited by examiner

Mode 1: Inspection/ServiceMode

| From Diagnostic Tool to DLC Port | From DLC Port (ECUs) to Diagnostic Tool |
|---|---|
| Request DTCs (Mode 03) | Stored DTCs |
| Request Live Sensor Data (Mode 01) | Live sensor values (e.g., RPM, coolant temp, throttle position) |
| Request Freeze Frame Data (Mode 02) | Freeze frame snapshot data |
| Clear DTCs (Mode 04) | Clear DTC Acknowledgement |
| Request Readiness Monitor Status (Mode 01 PID 01) | Readiness monitor bit flags |
| Request VIN and Calibration ID (Mode 09) | VIN and ECU metadata |

FIG. 2

Mode 2: Enhanced Inspection Mode

| From Diagnostic Tool to DLC Port | From DLC Port (ECUs) to Diagnostic Tool |
|---|---|
| All Mode 1 requests | OEM-enhanced sensor parameters (e.g., fuel rail pressure, EGR duty) |
| Request OEM-specific sensor data | ECU address responses for network map |
| Request topology map or module inventory | Mode 06 data (monitor test results) |
| Request Mode 06 data (on-board monitoring results) | OEM-specific freeze frames or failure records |
| Request DTC definitions and guided repair path | Enhanced fault metadata |
| Request access to technical bulletin references | Available software version or update status |

FIG. 3

Mode 3: Full Diagnostic (Pro) Mode

| From Diagnostic Tool to DLC Port | From DLC Port (ECUs) to Diagnostic Tool |
|---|---|
| All Mode 1 and 2 requests | Security access response (key/challenge success/fail) |
| Security access request (seed/key exchange) | Actuator function response or sensor confirmation |
| Actuator control commands (e.g., fan, injector, solenoid) | Programming status and CRC validation |
| ECU reprogramming/initiation request | Relearn success/failure status |
| Adaptation/relearn commands (e.g., throttle, transmission) | Acknowledgement of high-risk command execution |
| Immobilizer or key programming request | Real-time ECU feedback during active testing |

FIG. 4

Access Mode Tool Availability

| Function / Tool | Mode 1: Inspection/Service Mode | Mode 2: Enhanced Inspection mode (With VIN) | Full Access (With VIN) |
|---|---|---|---|
| Read and clear DTCs | ✓ | ✓ | ✓ |
| View live sensor data | ✓ | ✓ | ✓ |
| Emissions readiness check | ✓ | ✓ | ✓ |
| Freeze frame data display | ✓ | ✓ | ✓ |
| Generic maintenance reminders | ✓ | ✓ | ✓ |
| Vehicle-specific DTC definitions | | ✓ | ✓ |
| VIN-specific service intervals | | ✓ | ✓ |
| OEM-specific freeze frame analysis | | ✓ | ✓ |
| Vehicle-specific wiring diagrams | | ✓ | ✓ |
| Access to bidirectional controls | | | ✓ |
| Module programming/flashing | | | ✓ |
| Key/immobilizer programming | | | ✓ |
| Actuator/sensor calibration | | | ✓ |

FIG. 10

| Area Variant | | Added Functionality |
|---|---|---|
| User Interface | Role-Based Access with Biometric Login or Smart Badge | Automatically activates the appropriate mode based on the technician's identity or role. Adds a secure, user-tailored interface. |
| System Architecture | Mode-Specific Interface Loading | Loads distinct software modules for each mode. Enhances claim strength through structural separation. |
| Safety | Dynamic Safety Sandbox or Lockout | Restricts sensitive operations (e.g., actuator control) in Entry Mode using hardware/software barriers. |
| AI Assistance | Adaptive Mode Recommendations | Uses machine learning or real-time logic to suggest optimal mode transitions based on DTC severity or system analysis. |
| Collaboration | Real-Time Dual-Mode Collaboration | Enables simultaneous use of both modes by different users (e.g., service advisor and technician), potentially via cloud sync or split screen. |
| AR/VR Integration | Integrated Guided Repair Mode | Provides video walkthroughs, AR overlays, or visual instructions in Entry Mode only. Enhances usability and reduces training costs. |
| Software Licensing | Over-the-Air Mode Licensing | Allows temporary Pro Mode unlock via remote licensing or pay-per-job usage. Supports business method claims. |
| Security/Compliance | Auditable Access Logs for Compliance | Tracks usage data including user ID, VIN, and operations in Pro Mode. Useful for warranty, legal, or fleet audit purposes. |
| Vehicle Detection | Vehicle-Side Profile Matching | Automatically adjusts available features based on vehicle data (e.g., CAN support level or ECU architecture). |

FIG. 11

MODULAR AUTOMOTIVE DIAGNOSTIC PLATFORM WITH PROGRESSIVE FEATURE UNLOCKING

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to systems and methods for vehicle diagnostics and service tools that provide varying levels of diagnostic capability based on user role, access rights, or functional risk level. The disclosure more particularly relates to a multi-mode diagnostic platform in which diagnostic operations are organized into tiered access modes, such as inspection/service mode, enhanced inspection mode, and full diagnostic mode, wherein higher-risk operations are gated by credentialed authentication and selectively provisioned upon verification.

2. Description of the Related Art

Motor vehicles, regardless of their level of technology, have always required, and will always require, repair and maintenance. From the earliest gasoline-powered machines to today's software-defined vehicles, mechanical wear, environmental stress, and electronic failures are inevitable outcomes of regular use. Whether due to aging components, safety system faults, or software misconfigurations, diagnostic insight is essential to identifying problems and restoring vehicle performance. As long as vehicles exist, the need to detect, analyze, and correct faults will remain a permanent and fundamental aspect of automotive service.

Vehicle diagnostics have undergone a remarkable transformation over the past century, evolving from purely observational, mechanical techniques to intelligent, software-driven systems integrated with cloud services and vehicle networks. In the earliest years of automotive repair, diagnostics were rooted in experience and intuition. Technicians relied on sight, sound, smell, and touch to identify faults, listening for misfires, checking for smoke, feeling for vibration, or observing unusual wear. Repairs often involved trial and error, guided by a mechanic's familiarity with specific vehicle models. There were no sensors or digital tools, only wrenches, vacuum gauges, timing lights, and service manuals.

Between the early days of mechanical diagnosis and the emergence of formal on-board diagnostic systems, there was a vital transitional period characterized by manual test equipment, electronic meters, and early engine analyzers. From the 1950s through the 1970s, as vehicles incorporated more electrical components, such as alternators, transistorized ignition systems, and electric fuel pumps, technicians began using analog diagnostic instruments to probe system behavior.

This era saw the rise of oscilloscopes, vacuum gauges, tach/dwell meters, and compression testers, often used in combination to infer problems from physical or electrical symptoms. One of the most notable diagnostic tools of the time was the Sun Engine Analyzer, a large console that could analyze ignition waveforms, cylinder balance, charging systems, and more. These machines provided visual readouts on cathode ray tubes, helping mechanics understand what was happening inside an engine without disassembly.

Electronic Control Units (ECUs), are embedded computers that were adopted to manage and monitor various functions within a vehicle. First introduced in the late 1970s and early 1980s, ECUs were initially adopted to improve fuel efficiency and meet increasingly strict emissions regulations. The earliest, ECUs controlled basic engine functions such as fuel injection and ignition timing, replacing mechanical systems with electronically governed precision. Over time, as automotive technology advanced, ECUs proliferated across vehicle systems, controlling everything from transmission shifts and braking to airbag deployment, climate control, and infotainment. Today, modern vehicles can contain dozens of interconnected ECUs, each responsible for a specific subsystem, communicating in real time over in-vehicle networks. Collectively, they form the digital nervous system of the vehicle, enabling everything from adaptive cruise control to advanced driver assistance and real-time diagnostics.

By the late 1960s and early 1970s, some manufacturers, particularly GM, Ford, and Chrysler, began developing proprietary diagnostic connectors and service tools for use in dealer service bays. These were not true on-board diagnostic (OBD) systems, but they allowed technicians to interface with rudimentary ECUs using early microprocessors. One such example was the Chrysler Diagnostic Readout Box (DRO), which plugged into a connector under the hood and displayed numerical fault codes related to emissions or ignition faults.

At the same time, the California Air Resources Board (CARB) began pushing for better emissions control, which required vehicles to not only reduce emissions but also be capable of detecting when emissions systems were malfunctioning. This pressure laid the groundwork for OBD-I, but before it was mandated, various manufacturers experimented with early electronic feedback carburetors, oxygen sensor loops, and, electronically controlled timing adjustments, each with limited fault monitoring.

These systems required specialized test procedures that varied by brand and even by model year. Manuals became thick with pin-out charts, voltage thresholds, and resistance specs, which technicians used with multimeters and breakout boxes to diagnose system behavior. This made diagnostics highly technical and often inaccessible to independent repair shops, who lacked the expensive proprietary tools used by dealers.

This fragmented landscape made the industry increasingly aware of the need for standardization, both for repairability and regulatory enforcement. When OBD-I emerged in the 1980s, it was a direct response to this complexity but still suffered from non-uniform protocols and connectors. Only with the implementation of OBD-II in 1996 did the automotive industry achieve a consistent diagnostic framework.

As vehicles became more complex in the mid-20th century, particularly with the introduction of electronic ignition and early emissions controls, the need for more structured diagnostic processes grew. By the 1980s, the first generation of on-board diagnostic systems (later termed OBD-I) began appearing in production vehicles. These systems were introduced primarily to meet new government mandates for emissions control. They included rudimentary, ECUs and basic sensors that could detect failures affecting emissions output. However, OBD-I systems were manufacturer-specific, with proprietary connectors and unique fault code sets. There was no standardization, making diagnosis across brands difficult and requiring special tools that were often limited to dealership service departments.

This fragmented landscape changed with the introduction of the second-generation On-Board Diagnostics standard, OBD-II, which became mandatory in the United States for all light-duty vehicles beginning in model year 1996. OBD-II introduced a universal 16-pin diagnostic connector, a standardized set of diagnostic trouble codes (DTCs), and common communication protocols, enabling the development of general-purpose scan tools. These tools could read emissions-related codes, monitor live data from sensors, and verify readiness for emissions testing. OBD-II also established a framework for regulatory compliance, enabling faster and more reliable vehicle inspections via electronic diagnostics.

As electronic control expanded beyond emissions and powertrain systems, modern vehicles began incorporating dozens of ECUs managing everything from airbags and ABS to navigation, infotainment, and climate control. While OBD-II remained the baseline for regulatory data, manufacturers developed extensive proprietary diagnostic protocols for non-emissions systems. This led to the rise of advanced scan tools capable of accessing manufacturer-specific data, performing bidirectional commands, running system calibrations, and even programming new control modules. Many of these features remained limited to dealership-level tools, though aftermarket tools began reverse-engineering capabilities to compete.

In modern OBD systems, communication between a diagnostic tool and a vehicle's ECUs follows a structured request-and-response model. Most live data and system information is accessed using standardized or manufacturer-specific PIDs (Parameter IDs), which are identifiers used within certain diagnostic modes to request specific types of information. For example, Mode 01 is used to retrieve real-time sensor data such as engine RPM, throttle position, and coolant temperature, a stream commonly referred to as the live data feed. Other modes serve distinct purposes: Mode 03 returns stored diagnostic trouble codes (DTCs), Mode 02 provides freeze frame snapshots of conditions when a fault occurred, and Mode 09 returns vehicle information such as the VIN and calibration ID. Advanced or manufacturer-specific features, especially in professional-grade tools, may bypass traditional PIDs altogether and use UDS (Unified Diagnostic Services) protocols, which operate on Service IDs (SIDs), Data Identifiers (DIDs), or routine control commands. Each query sent from the diagnostic tool triggers a structured response from the relevant ECU, returning either the requested data, a confirmation of command execution, or a failure code if access is denied or unsupported. This bidirectional communication mode ensures that tools can request granular, real-time or stored diagnostic information, and ECUs can respond with precise, mode-specific outputs.

Beyond the commonly used Modes 01, 03, and 09, the OBD-II protocol includes a total of ten standardized diagnostic modes, each designed to access a distinct category of vehicle data or functionality. These modes define the structure of communication between the diagnostic tool and the vehicle's ECUs, governing what types of requests can be made and how the ECUs respond. A summary of OBD modes follows.

Mode 01, as described earlier, is used to retrieve live data from a vehicle's sensors. These values are queried using PIDs, with each PID corresponding to a specific sensor or calculated value, such as engine RPM, oxygen sensor voltages, or short-term fuel trim. This mode is essential for real-time monitoring and diagnostics.

Mode 02 accesses freeze frame data, which is a static snapshot of key sensor readings captured at the moment a DTC is set. This allows technicians to see the engine conditions present when a fault occurred. Unlike Mode 01, this data is not live, but represents a preserved state useful for forensic-style diagnosis.

Mode 03 returns stored DTCs, which are standardized fault codes that identify problems in the powertrain or emissions systems. These codes follow a structured format and are not associated with PIDs. Mode 07 and Mode GA are closely related: Mode 07 returns pending DTCs, issues the ECU has detected but not yet confirmed, while Mode GA provides permanent DTCs, which are retained in memory until the fault is resolved and verified through drive cycle criteria.

Mode 04 is a command mode used to clear DTCs and associated freeze frame data. It sends a reset command to the ECUs, often after repairs have been completed. This is one of the few modes that performs an action rather than requesting information, and it does not use PIDs.

Mode 05 is primarily used in older vehicles with pre-CAN bus architectures. It provides oxygen sensor test results, including minimum and maximum voltages, response times, and other performance metrics for 02 sensors and related systems.

Mode 06 reports the on-board monitor test results, which cover components that undergo self-diagnostic tests (e.g., EGR, catalytic converter efficiency). Rather than using PIDs, this mode returns test IDs and component IDs, along with results that show whether monitored systems pass or fail internal tests.

Mode 08 is a control mode that allows the diagnostic tool to issue commands to control components, such as turning the air pump on or off, though access to this mode is often restricted due to the potential for misuse or unintended effects.

Mode 09 is used to retrieve vehicle information, including the VIN, calibration ID, and other metadata. These are returned using structured PIDs, similar in format to Mode 01.

Finally, Mode 10 (GA) returns permanent fault codes, which are maintained until the issue has been both corrected and confirmed through drive cycle verification. These cannot be erased manually with Mode 04, ensuring that emissions-related faults remain flagged until properly resolved.

In summary, the OBD system supports a wide range of diagnostic interactions through these ten modes, some relying on PIDs, others on test IDs or command structures. Together, they provide a robust framework for both general-purpose diagnostics and advanced vehicle service, with increasing levels of access and complexity depending on the capabilities of the tool and the experience level of the user.

As on-board diagnostic systems became standardized and increasingly powerful, the tools used to access them followed their own distinct evolution. Initially, OBD functionality was confined to expensive, manufacturer-specific scan tools used exclusively by dealership technicians. These devices were often physically large, complex to operate, and deeply integrated into OEM service workflows. Even with the arrival of OBD-II and its universal connector, early scanners remained costly and were still primarily marketed to professional shops. But over time, as the OBD-II standard gained traction, consumer demand and advancements in electronics enabled a gradual shift. Compact, handheld code readers emerged that could interpret basic engine fault codes and reset the check engine light, an important development that opened diagnostic access to independent shops and skilled hobbyists. The trend accelerated in the 2010s with the widespread availability of Bluetooth-enabled dongles that paired with smartphone apps. These devices, powered by mobile computing and user-friendly interfaces, allowed everyday drivers to view live data, read and clear codes, and track basic vehicle health. What had once been the domain of factory-trained professionals became accessible to tech-savvy vehicle owners. Today's OBD tools, whether app-based or dedicated, frequently integrate with cloud services, offering diagnostic assistance, repair recommendations, and even cost estimates in real time. These tools represent the final stage of democratization: a diagnostic landscape where both expert technicians and ordinary drivers can interact with complex vehicle systems using devices no larger than a key fob.

Diagnostic platforms have evolved to integrate telematics, guided repair workflows, remote troubleshooting, and access to extensive technical databases. Tools like Innova's RepairSolutionsPRO, and others began offering cloud-based support systems that augmented traditional diagnostics with technician forums, procedural videos, and VIN-specific repair recommendations.

Today, the landscape of vehicle diagnostics is defined by security specialization, and intelligent architecture. High-risk operations, such as flashing, immobilizer resets, and ADAS calibrations, are increasingly gated behind secure authentication layers. Technicians must log into manufacturer systems or third-party credential platforms to access these functions. Systems now offer multi-tiered access modes, where basic users may only retrieve codes and live data, while certified technicians with valid credentials can unlock deeper diagnostic functionality. Regulatory shifts have also influenced tool design; for example, Secure Gateway Modules in vehicles from FCA (Stellantis) and others require scan tools to authenticate before accessing core, ECUs, preventing unauthorized access to critical systems.

Providing unsophisticated users with unrestricted access to all OBD system capabilities poses serious risks to both vehicle integrity and user safety. Modern vehicles rely on ECUs that manage essential systems such as engine performance, braking, steering, emissions, and safety restraints. Advanced diagnostic tools can issue commands that directly manipulate these systems, such as actuator tests, module resets, and software reprogramming. In the hands of an untrained user, these functions can easily lead to unintended consequences, including disabling safety features like ABS or airbags, interrupting transmission behavior, or corrupting, firmware, potentially rendering a module inoperable. Inadvertent resets of calibration or adaptive learning data can further degrade performance, causing symptoms such as rough idling, erratic shifting, or failed emissions checks. Additionally, unrestricted access opens security vulnerabilities. Some OBD functions can override or reconfigure vehicle anti-theft systems, modify key programming, or alter vehicle identity parameters like the VIN, making the vehicle more susceptible to theft or fraud.

From a regulatory standpoint, unrestricted access also allows users to tamper with emissions controls, disabling components or clearing readiness monitors without correcting the underlying issue. This not only undermines inspection protocols but may also result in vehicles operating outside legal environmental limits. Beyond legal concerns, improper use of diagnostic tools can trigger the mechanical activation of critical components such as fuel pumps, fans, or actuators, posing risks of injury or damage during servicing. Perhaps most common, though, is the risk of misdiagnosis: inexperienced users may misinterpret sensor data or fault codes, leading to unnecessary repairs, escalating costs, or the neglect of more serious problems. In many cases, such actions can also violate warranty terms or create traceable modifications that void manufacturer coverage.

Thus, there is a need in the art for a diagnostic system and related methodology that provides gated-access to diagnostic systems and data based on a variety of access-related factors.

BRIEF SUMMARY

In accordance with an example embodiment of the present disclosure, a vehicle diagnostic system includes a processor, memory, a user interface with both input and display capabilities, and a diagnostic data interface that connects to a vehicle's on-board diagnostic (OBD) system. The processor is configured to control various diagnostic functions, establish communication with one or more electronic control units (ECUs), and display selectable diagnostic access modes on the user interface. A user may select either an informational access mode or an advanced access mode. When the informational mode is selected, the system enables only basic diagnostic functions. If the advanced mode is selected, the system enables both the basic and more powerful diagnostic capabilities.

In another example embodiment, the informational access mode includes safe, read-only operations such as retrieving diagnostic trouble codes (DTCs), accessing freeze frame data, and viewing live sensor readings.

In another example embodiment, the advanced access mode adds enhanced functionality, including the ability to send active control commands to vehicle systems, initiate actuator tests, perform ECU firmware updates, conduct system calibrations, or reprogram vehicle modules.

In another example embodiment, the system is able to receive and process a vehicle identification number (VIN), or other vehicle-identifying data. Based on the VIN, the system may selectively enable additional diagnostic functions specific to that vehicle's make, model, and year, whether the user is in informational or advanced access mode.

In a further example embodiment, access to the advanced diagnostic mode is protected by user authentication, which is performed through a cloud-based credentialing service. Only users who successfully verify their identity can access invasive or system-altering functions.

In another example embodiment, VIN-based diagnostic functions are not loaded or made available unless the VIN matches a predefined compatibility profile stored in the system. These functions may be modular and are activated dynamically to reduce memory footprint and avoid unauthorized use.

In another example embodiment, the system includes a mode escalation feature that analyzes real-time diagnostic activity or repair workflow events and recommends switching to a higher access level when needed, such as when a fault code suggests a deeper investigation is warranted.

In a further example embodiment, the same functional structure is implemented as a method. The method includes presenting access modes, establishing ECU communication, enabling safe functions when informational access is selected, and enabling both safe and advanced functions when the advanced mode is selected. It may also include reading a VIN, performing cloud-based credential checks, activating modular features based on VIN compatibility, and recommending access mode changes in response to diagnostic context.

In yet another example embodiment, the invention is implemented as software stored on a non-transitory computer-readable medium. The software includes instructions that guide the processor to handle access modes, VIN processing, credential verification, modular function activation, and mode escalation suggestions. It distinguishes between basic informational tools, which allow only data retrieval, and advanced tools, which can control or alter vehicle systems.

BRIEF DESCRIPTION OF THE DRAWINGS

These and other features and advantages of the various embodiments disclosed herein will be better understood with respect to the following description and drawings, in which:

FIG. 2 is a table illustrating examples of basic or inspection level diagnostic functions of a modular automotive diagnostic platform with progressive feature unlocking;

FIG. 3 is a table illustrating examples of intermediate level diagnostic functions of a modular automotive diagnostic platform with progressive feature unlocking;

FIG. 4 is a table illustrating examples of advanced level diagnostic functions of a modular automotive diagnostic platform with progressive feature unlocking;

FIG. 10 able of FIG. 10 summarizes an example of diagnostic functions available across defined access modes, each tier building upon the previous in both capability and required authorization; and FIG. 11 summarizes a range of modular system improvements designed to enhance the functionality, security, and adaptability of a multi-mode automotive diagnostic tool.

DETAILED DESCRIPTION

Figure 1:
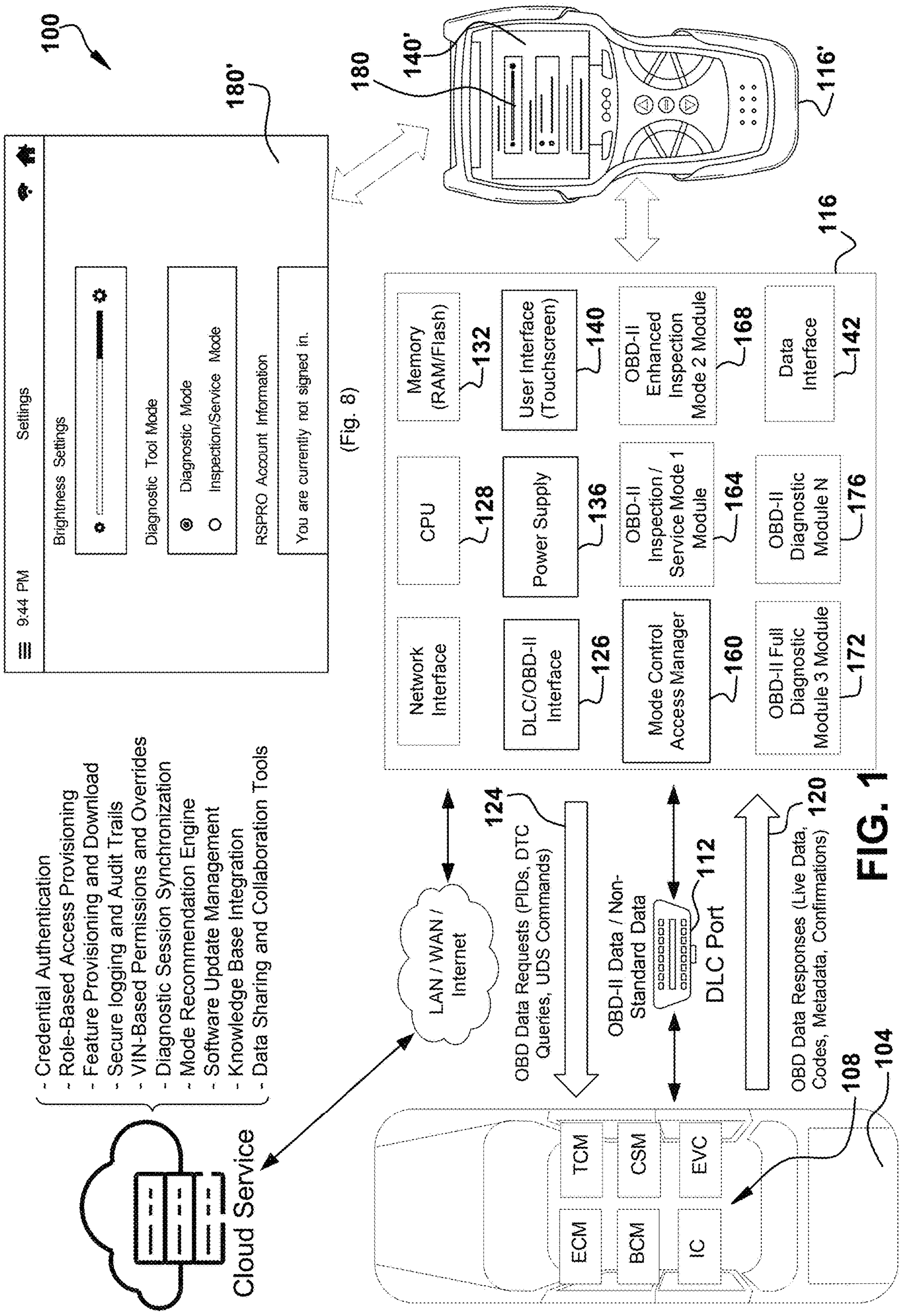
FIG. 1 illustrates a system diagram 100 of an example embodiment of a modular automotive diagnostic platform with progressive feature unlocking.

The detailed description set forth below in connection with the appended drawings is intended as a description of certain embodiments of a vehicle diagnostic system and related method, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Example embodiments herein provide a vehicle diagnostics system that includes multiple diagnostic access modes. In the context of the present disclosure, basic access mode, also referred to as informational diagnostic access mode, is defined as a limited-functionality diagnostic mode that permits the user to retrieve non-invasive diagnostic data from one or more vehicle ECUs without transmitting any commands that affect vehicle operation or system state. Functions permitted in this mode include, for example, reading and displaying DTCs, viewing freeze frame data associated with fault conditions, retrieving emissions readiness monitor status, accessing VINs, and streaming live sensor data for observation purposes only. This mode is intended to be inherently safe and universally accessible, such that it does not carry any risk of altering vehicle performance, safety systems, or calibration parameters. Informational access may also support passive functions such as exporting reports, generating health status summaries, and providing guidance based on retrieved data, without sending any control signals to the vehicle.

By contrast, advanced access mode, referred to as command-enabled diagnostic mode, encompasses a set of diagnostic functions that include one or more operations capable of actively influencing vehicle systems. These operations may involve transmission of actuator control commands, execution of calibration routines, sensor adaptation, reprogramming of ECUs, initiation of system-level self-tests, or configuration of vehicle modules. Examples include commanding a radiator fan to turn on, actuating relays, resetting throttle position sensors, flashing firmware, initiating DPF regeneration, or programming immobilizer keys. Advanced access functions require a higher degree of technical knowledge and carry inherent risk to vehicle safety, emissions compliance, or drivability if misused. As such, this mode is typically restricted through credentialed login, role-based access control, or cloud-based authentication. In some embodiments, advanced functions are not preinstalled in the system but are selectively downloaded and instantiated only after successful user verification, thereby ensuring both operational safety and data security.

In one example embodiment, a vehicle diagnostic system includes a diagnostic device having a user interface, one or more processors, a diagnostic communication module, and a memory storing executable software instructions. The system establishes communication with one or more vehicle ECUs through a standardized OBD connector using diagnostic protocols such as CAN, ISO 9141, KWP2000, or SAE J1850. Upon successful connection, the user is prompted to select a mode of operation. The system includes a function switch mechanism allowing the user to toggle between Inspection/Service Mode and Diagnostic Mode. The Inspection/Service Mode offers basic features such as DTC reading and clearing, live data streaming, freeze frame access, and emissions readiness reporting. The Diagnostic Mode includes advanced functionality such as bidirectional control, ECU programming, and system-specific tests.

In another example embodiment, the system introduces a secure cloud-based authentication mechanism to gate access to the Diagnostic Mode. Users are prompted to provide login credentials or submit a security badge, token, or biometric input. These credentials are verified through a remote cloud platform such as RepairSolutionsPro (RSPRO), offered by Innova. If authentication is successful, advanced diagnostic functions are unlocked; otherwise, access is limited to the Inspection/Service Mode. This approach prevents unqualified users from executing high-risk functions.

In a further example embodiment, the system architecture expands to a three-tiered access structure: (1) Inspection/Service Mode, (2) Enhanced Inspection Mode, and (3) Full Diagnostic Mode. This tri-level structure allows for refined task matching and user role segmentation. Inspection/Service Mode remains accessible to non-professional users, providing baseline functionality for initial assessment and intake.

In yet another example embodiment, the Enhanced Inspection Mode allows more advanced functionality without introducing operational risk. This includes advanced graphing of sensor data, visualization of network topologies, integration with OEM maintenance schedules, DTC-linked instructional videos, and vehicle-specific wiring diagrams. These tools are made available to mid-level technicians or through basic account login, ensuring non-invasive operation while extending diagnostic depth.

In still another example embodiment, the Full Diagnostic Mode includes professional-grade functions such as bidirectional actuator control, ECU reprogramming, adaptation resets, sensor calibration, immobilizer/key programming, and module configuration. Access to these high-risk operations is secured by credential verification and cloud-based provisioning. The corresponding software modules are only downloaded after successful authentication, preventing tampering or misuse.

In a further example embodiment, the system dynamically adjusts access privileges based on technician role, vehicle VIN, or contextual need. A mid-level technician may default to Enhanced Inspection Mode, with temporary upgrades granted under supervisory approval. A built-in recommendation engine can suggest access tiers based on fault severity, historical patterns, or system complexity, ensuring appropriate tool usage.

In another example embodiment, the user interface dynamically adapts, or in certain configurations autonomously adapts, to the user's authenticated level. When dynamic adaptation is employed, the interface adjusts in real time based on the user's credentials, presenting simplified menus, visual aids, and minimal jargon for general users, while displaying detailed diagnostic trees, expanded menus, and labeled parameters for professionals. In implementations featuring autonomous adaptation, these adjustments occur without explicit user input, based on preset access policies or real-time credential evaluation. Core features reside locally on the device, while sensitive functions are dynamically provisioned post-login for security and compliance.

In another example embodiment, the diagnostic system includes a robust fail-safe protocol. Unauthorized login attempts result in automatic fallback to safe-mode operation with reduced functionality. All authentication activity is logged for traceability. This embodiment ensures a balance between usability for consumers and full capability for credentialed professionals, protecting both users and vehicles.

In certain embodiments, the vehicle diagnostic system is configured to receive and process multiple types of metadata in addition to core diagnostic signals. As used herein, metadata refers to contextual or auxiliary information that helps characterize the diagnostic environment and refine system operation. This metadata includes, but is not limited to, vehicle metadata, user metadata, and session metadata.

Vehicle metadata refers to non-primary but contextually relevant data associated with the target vehicle and its onboard systems. Examples of vehicle metadata include the vehicle identification number (VIN), make, model, model year, engine configuration, transmission type, fuel type, odometer reading, software or firmware versions of individual ECUs, diagnostic communication protocol used (e.g., CAN, KWP2000, ISO 9141), and historical fault or repair codes. This information may be retrieved locally from the vehicle's onboard systems via standardized queries or received from a remote database, and is used to tailor feature availability, enforce compatibility rules, and guide diagnostic workflows.

User metadata refers to data related to the technician or user interacting with the diagnostic system. This may include user role or certification level, access credentials, usage history, feature enablement history, access scope defined by licensing terms, preferred settings or language, and authentication status (e.g., whether the user has been validated by a cloud-based authentication server). The diagnostic system may use user metadata to restrict access to certain modes or functions, present tiered or simplified user interfaces, or log activities for audit or compliance purposes.

Session metadata refers to dynamic context generated during a specific diagnostic or service session. Examples include timestamped logs of system interaction, list of accessed functions, selected diagnostic modes, detected faults, service actions initiated, VIN association, vehicle connection status, and mode transitions. Session metadata can also include real-time state variables such as the selected access mode, the response time of specific ECUs, or safety interlock conditions. This information may be used to guide mode escalation recommendations, enforce session-specific policies, or support audit logging and technician training analytics.

In some embodiments, the diagnostic system is configured to activate vehicle-specific tool functions only if a received VIN corresponds to one or more predefined compatibility profiles stored locally or in a remote database. These profiles may specify make, model, year, and optionally sub-model or trim levels for which certain advanced or specialized features are available. Upon receiving the VIN and determining a match to a compatibility profile, the processor modularly activates the applicable tool functions, enabling access to diagnostic or configuration features tailored to that specific vehicle platform. Additionally, the system may incorporate a mode escalation mechanism operable to recommend a switch from an informational access mode to an advanced access mode. This recommendation may be automatically triggered in response to real-time diagnostic findings, such as detection of severe DTCs, or based on workflow context, such as a user selecting a repair procedure requiring actuator control or configuration updates. These capabilities enhance both safety and efficiency by aligning tool features with both vehicle requirements and user proficiency.

FIG. 1 illustrates a system diagram 100 of an example embodiment of a modular automotive diagnostic platform with progressive feature unlocking. Vehicle 104 includes one or more ECUs 108 from which vehicle OBD data is obtainable via diagnostic link connector (DLC) port 112. A data connection is established between scan tool 116 and DLC 112 for communication of OBD requests 120 and OBD responses 124 via DLC/OBD-II interface 126.

Scan tool 116 includes a processor 128, volatile and non-volatile memory 132, power supply 136 and user interface 140, suitably comprised of a touchscreen. Data interface enables data communication with external devices, suitably by wired connection, such as USB or a wireless connection, such as Bluetooth or near filed communication (NFC). Network interface 144 provides data communication to cloud server 148 via network cloud 152. Network cloud 152 is suitably comprised of any wireless or wired data path and may be comprised of one or more local area networks (LANs), wide area networks (WANs) which may comprise the Internet, or any suitable combination thereof.

Cloud server 148 suitably functions for access control, feature provisioning, and secure operation. When a user attempts to access advanced features, the cloud authenticates credentials, whether passwords, smart tokens, or biometrics, and assigns access levels based on technician roles stored in a secure user database. These roles determine whether the user receives only baseline Inspection/Service Mode functions or is granted Enhanced or Full Diagnostic Mode capabilities. Once validated, the server delivers software modules dynamically, only downloading high-risk diagnostic tools like actuator control, reprogramming, or immobilizer resets when authorized, keeping them off the device for safety. Each login attempt and diagnostic action is logged on the server, creating a tamper-resistant audit trail tied to user identity, VIN, and timestamp. The cloud may also apply VIN-specific restrictions, allowing only certain users to access full diagnostics for specific vehicles, with supervisors able to grant temporary overrides. During diagnostic sessions, real-time data such as DTCs, test results, and live sensor streams can be synchronized with the cloud, enabling session continuity or collaborative review. The server also hosts a mode recommendation engine that evaluates the fault codes, system complexity, or historical usage to suggest the most appropriate access mode, helping prevent misuse. In addition, the cloud pushes firmware and software updates to the device to maintain compatibility with evolving protocols and OEM updates. Integrated knowledge base services supplement the diagnostic experience by linking DTCs to OEM repair instructions, video guides, and known-fix databases. For collaborative environments, the server enables secure sharing of scan reports, annotations, and vehicle data across teams or platforms. Together, these services provide a dynamic, secure, and scalable framework that empowers professional users while safeguarding vehicle systems from unauthorized access.

Scan tool 116 is configured to support multiple tool capability access modes, suitably administered by mode control access manager 156. In the illustrated example, at least three access modes are available and enabled in conjunction with mode access control manager 160.

- Mode 1 (Inspection/Service Mode), operable in conjunction with inspection/service module 164, provides basic scan tool operations and is particularly suited for simple tasks or unsophisticated users. Mode 1 provides basic diagnostic functions such as reading and clearing DTCs, viewing live data, checking emissions readiness, and accessing freeze frame information, ideal for initial assessments and routine service tasks. Example diagnostic activities for Mode 1 are illustrated in the table of FIG. 2.
- Mode 2 (Enhanced Inspection Mode), operable in conjunction with enhanced inspection module 168, adds safe, non-invasive tools like advanced data graphing, wiring diagrams, maintenance schedule integration, and DTC-linked instructional content without allowing control or reprogramming of vehicle systems. Example diagnostic activities for Mode 2 are illustrated in the table of FIG. 3.
- Mode 3 (Full Diagnostic Mode), operable in conjunction with full diagnostic module 172, enables advanced, high-risk functions including bidirectional actuator control, ECU programming, sensor recalibration, and key or immobilizer coding, accessible only after credentialed login to ensure proper authorization. Example diagnostic activities for Mode 4 are illustrated in the table of FIG. 4.
- In Mode 3, also referred to as the command-enabled or advanced diagnostic mode, the system enables execution of high-level diagnostic procedures, including but not limited to Special Function tests. These functions often require direct ECU interaction and may modify system states or trigger actuators. Example Special Functions include diesel particulate filter (DPF) regeneration, brake system bleeding, throttle body and steering angle sensor calibrations, injector coding, and battery registration. Because these procedures carry the potential to impact vehicle operation, Mode 3 access is tightly controlled through credential verification, VIN-based compatibility checks, and dynamic provisioning logic.

In addition to the three core operational tiers, Inspection/Service Mode, Enhanced Inspection Mode, and Full Diagnostic Mode, various additional access modes can be implemented to better support specialized use cases, user types, and workflow environments. These modes are suitably operable in conjunction with an associated module, illustrated by diagnostic module 176. For instance, a Quick Scan Mode may be provided to deliver rapid vehicle assessments, particularly suited for customer intake, used vehicle inspections, or fleet check-ins. This mode may initiate an automated DTC scan across all accessible ECUs, retrieve emissions readiness statuses, and generate a condensed summary report without requiring full user navigation through individual systems. The process may be initiated with minimal user input and completed within seconds, making it ideal for high-throughput scenarios.

A Training or Demo Mode may also be included, designed for educational environments, product demonstrations, or technician onboarding. In this mode, the tool may simulate diagnostic sessions without establishing live vehicle communication. Virtual ECUs may be emulated, and synthetic DTCs, sensor values, and freeze frame data sets may be injected to mimic real-world behavior. This allows new users to gain experience with diagnostic workflows, guided test procedures, and interface navigation without risk of damaging a live vehicle.

An OEM Partner Mode may be reserved for users affiliated with original equipment manufacturers or authorized service networks. This mode can unlock proprietary diagnostic functions, such as factory-level ECU flashing, immobilizer resets, module initialization, and access to OEM service bulletin integration. Activation of this mode may require special credentials issued by the OEM or verified through a dedicated enterprise authentication layer. Such capabilities enable the scan tool to serve as a drop-in replacement for factory tools in certified repair facilities.

For fleet operators or enterprise service providers, a Fleet Mode can offer centralized diagnostic access and fleet-specific functionality. This mode may support VIN tagging, maintenance schedule tracking, aggregated scan result reporting, and synchronization with cloud-based dashboards for remote fleet management. In this context, the scan tool may also be configured to operate in batch mode, automatically scanning multiple vehicles sequentially with limited technician interaction.

To further support collaborative environments, a Remote Assist Mode may be included. In this mode, a technician operating the tool on-site can enable remote connectivity to a supervisor, expert technician, or OEM representative. The remote party may observe live data streams, provide real-time consultation via chat or voice, and even initiate tests with user authorization. This can greatly improve troubleshooting efficiency in field repair scenarios or complex diagnostic cases.

A Consumer Mode may also be considered, especially for diagnostic tools sold to vehicle owners or DIY users. This mode presents a simplified interface focused on high-value, low-risk information such as active and pending DTCs, emissions readiness status, oil life monitoring, and user-friendly repair advice. Terminology may be translated into plain language, and guidance may be included to direct the user to seek professional assistance when needed.

Finally, a Supervisory Mode may be reserved for shop managers, lead technicians, or enterprise administrators. This mode grants access to technician account settings, permission controls, usage logs, and override capabilities. Supervisors can enforce role-based access, review tool usage history, assign or revoke feature access, and audit completed diagnostic sessions to ensure proper compliance with shop policies or regulatory standards. Together, these expanded operational modes allow the diagnostic system to flexibly scale across user skill levels, organizational roles, and industry verticals while maintaining safety, efficiency, and system integrity.

In the illustrated example, touchscreen user interface 140' shows display screen 180 having an expanded view at 180. The touchscreen interface of the diagnostic tool supports a variety of screen types tailored to different diagnostic tasks and user roles. These include a home screen with mode selection options as illustrated, user login prompts, and access to settings or updates. Once a mode is selected, system scan screens provide summaries of detected ECUs, fault codes, and readiness monitors. Live data screens display real-time sensor readings, often with graphical visualizations or sortable tables. DTC detail screens show fault descriptions, freeze frame data, and related repair guidance, sometimes linking to OEM service procedures or videos. In more advanced modes, bidirectional control screens allow the user to activate components (like fans or solenoids) with on-screen buttons or sliders. Programming and adaptation screens guide users through step-by-step processes for resetting modules, calibrating sensors, or pairing keys. The interface may also present wiring diagrams, network topology maps, repair history logs, and session summaries. In consumer or guided use cases, the screens may include simplified language, visuals, or AI-generated explanations to make complex data more approachable. Throughout all modes, the layout is optimized for clarity, safety, and minimal risk of accidental misuse.

Figure 5:
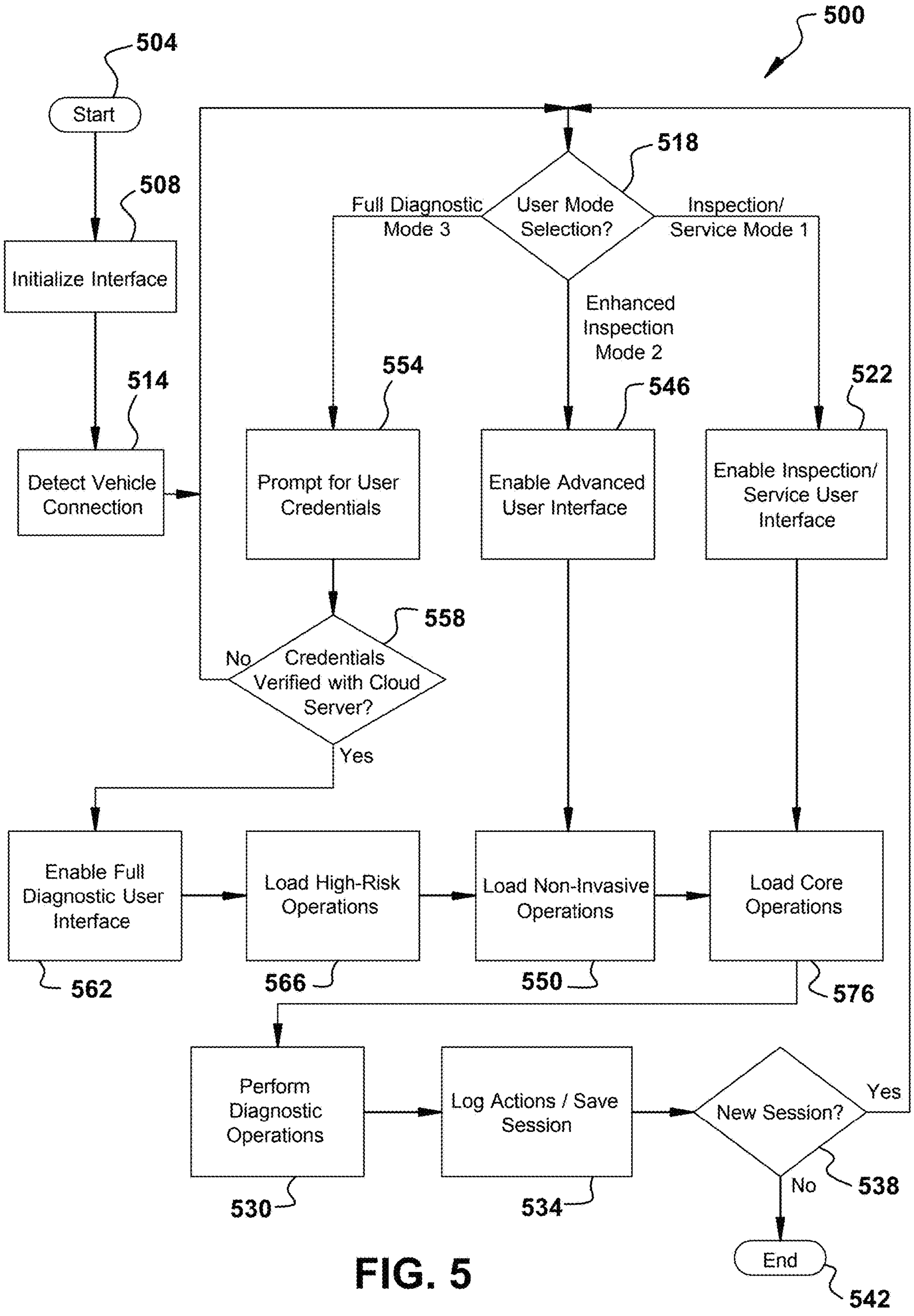
FIG. 5 illustrates a flowchart of an example embodiment of a modular automotive diagnostic platform with progressive feature unlocking.

FIG. 5 illustrates a flowchart 500 for an example embodiment of a modular automotive diagnostic platform with progressive feature unlocking. The system commences at block 504 and proceeds to block 508 where a scan tool user interface is enabled. The tool is placed in data communication with vehicle ECUs, suitably by a DLC port and connection is detected at block 514. Next, at block 518, the user makes a selection of inspection/service Mode 1, enhanced inspection Mode 2 or full diagnostic Mode 3. If Mode 1 is selected, the associated interface is enabled at block 522 and core operations are loaded at block 526. Selected diagnostic operations are completed at block 530 and the session and associated actions are logged at block 534. If another session is selected at block 538, the system returns to block 518. If not, the system ends at block 542. As Mode 1 is associated with the most basic features, the functionalities associated with Mode 1 may be implemented autonomously in response to selection of Mode 1 by the user, or alternatively in response to connection with the DLC port, without any authorization or authentication procedures.

If Mode 2 is selected at block 518, an advanced user interface is enabled at block 546, and non-invasive diagnostic operations are loaded at block 550. The system progresses to block 526 where the core operations are added, and the system proceeds as with Mode 1, but with all Mode 1 and Mode 2 operations available.

In certain embodiments, access to Mode 2 may be provided without requiring user authentication, allowing general service personnel or mid-level technicians to utilize expanded diagnostic resources without engaging in high-risk operations. This mode builds upon the capabilities of Mode 1 by offering advanced data visualization, network topology views, OEM maintenance schedules, wiring diagrams, and DTC-linked repair guidance, all of which are strictly informational and non-invasive in nature. Because these functions do not initiate control commands or modify vehicle state, they are considered safe for broader access. In some implementations, however, optional authentication may be employed to support user tracking, enable role-based feature customization, or satisfy licensing requirements for proprietary or VIN-specific content. Thus, Mode 2 remains highly flexible, offering enhanced functionality with minimal risk while retaining the ability to enforce access restrictions when policy, regulation, or content usage terms demand it.

If Mode 3 is selected at block 518, the user is prompted to supply credentials block 554. Supplied credentials are verified at block 558, suitably in conjunction with a check for Mode 3 authorization with an associated cloud server. If the credentials are unverified, the system returns to block 518 to allow for a different mode selection. If the credentials are verified, a full diagnostic interface is enabled at block 562, and high-risk operations loaded at block 566. The system proceeds to add non-invasive operations at block 550 and core operations at block 526. Accordingly, the authorized user is enabled to complete all operations from all modes.

FIGS. 6-9 show examples of diagnostic tool user interface screens.

Figure 6:
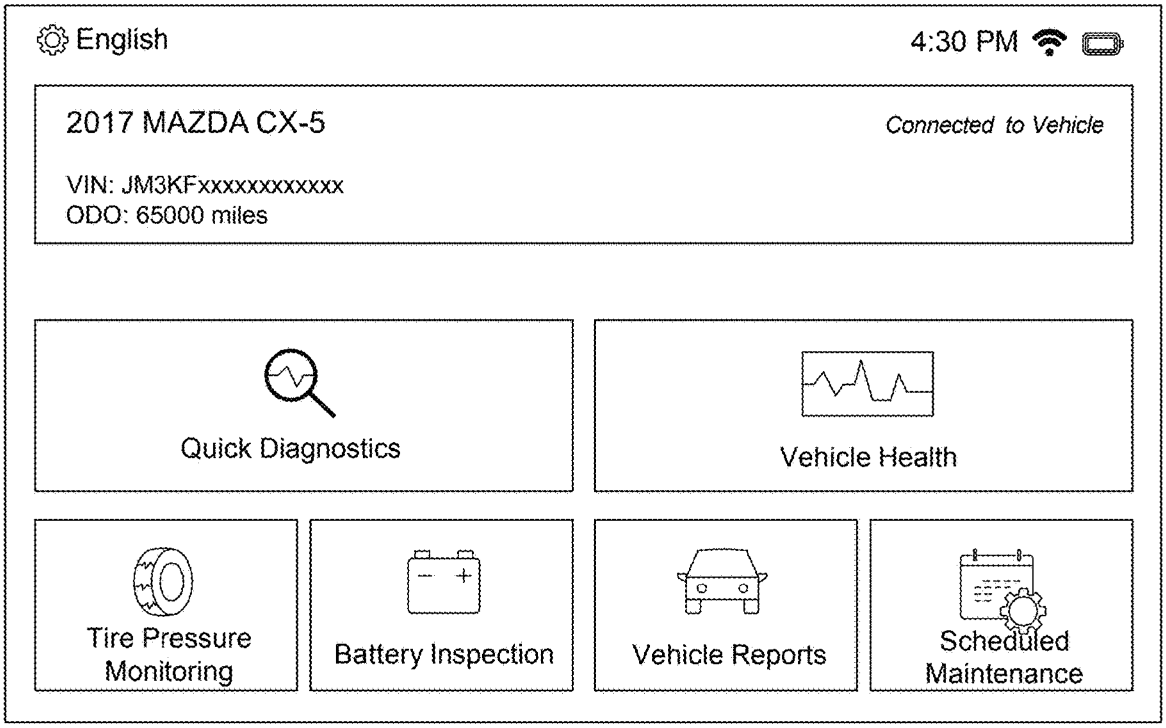
FIG. 6 illustrates an example embodiment of an Inspection/Service Mode screen as presented to an entry-level technician or service advisor for a modular automotive diagnostic platform with progressive feature unlocking.

FIG. 6 illustrates an Inspection/Service Mode screen as presented to an entry-level technician or service advisor. The layout is streamlined, offering access to only core diagnostic features such as reading and clearing diagnostic trouble codes (DTCs), viewing live sensor data, and checking emissions readiness monitors. The interface emphasizes safety and simplicity, using plain language labels, large icons, and limited control options to reduce the risk of user error. No advanced functions like actuator control or ECU reprogramming are shown or accessible in this view. The layout supports preliminary diagnosis and customer intake tasks and is intended for users with minimal technical training.

Figure 7:
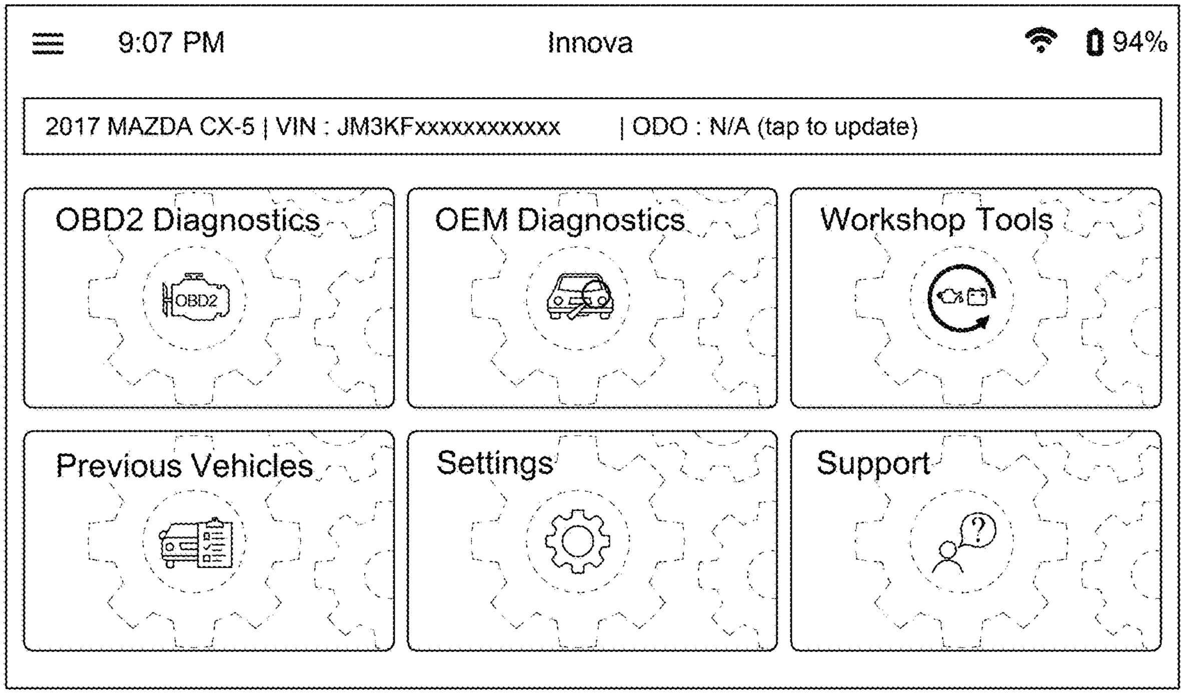
FIG. 7 illustrates an example embodiment of a Diagnostic Mode screen available to professional users who have authenticated with elevated credentials for a modular automotive diagnostic platform with progressive feature unlocking.

FIG. 7 shows a Diagnostic Mode screen available to professional users who have authenticated with elevated credentials. This interface exposes a broader and more advanced set of diagnostic tools, including bidirectional control options, special tests, sensor calibrations, and module programming capabilities. The layout includes additional navigation panels, deeper system menus, and access to OEM-specific functions. In contrast to FIG. 5, this screen prioritizes depth of functionality and assumes the user has technical training and authorization to perform invasive or high-impact diagnostic operations. The added complexity is managed through a layered UI that groups advanced tools by system category and function type.

Figure 8:
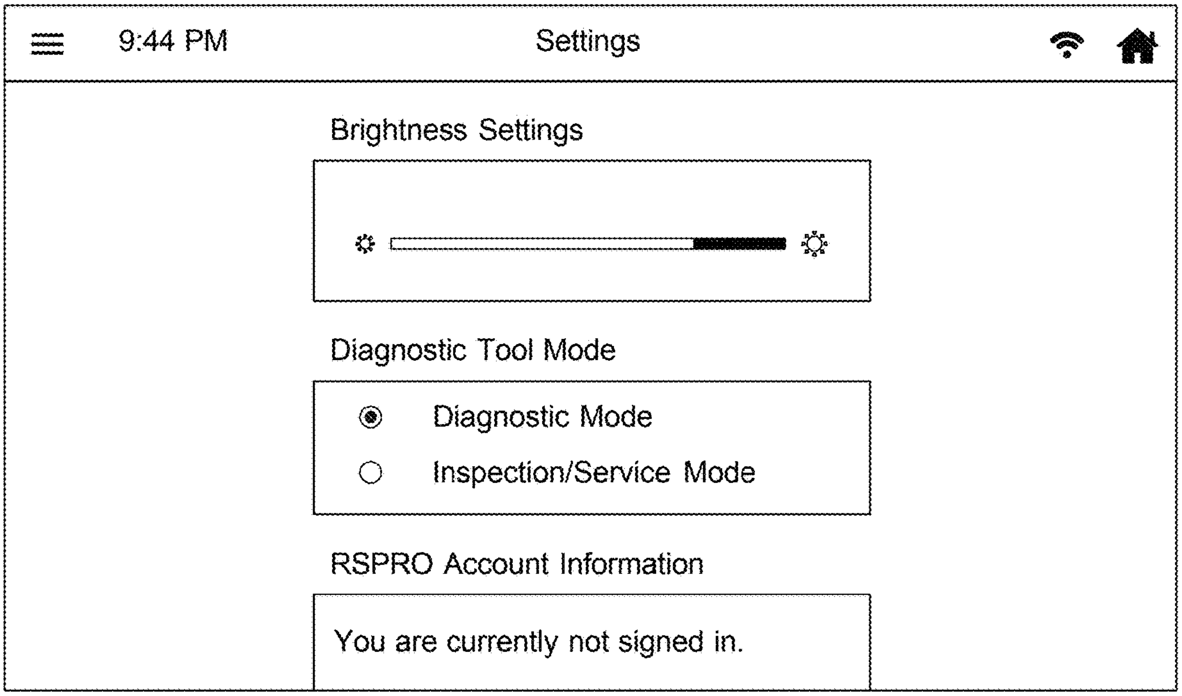
FIG. 8 illustrates an example of a Function Switch Mode screen, which acts as a transitional interface allowing the user to toggle between the Inspection/Service Mode and Diagnostic Mode for a modular automotive diagnostic platform with progressive feature unlocking.

FIG. 8 depicts an example of a user interface screen of a simplified version of a settings selection interface, displaying few visual elements and streamlined information layout. The top portion features Brightness Settings, and directly beneath that is a section titled Diagnostic Tool Mode offering two choices, Diagnostic Mode and Inspection/Service Mode—but without accompanying images or graphical icons. These options are presented as simple radio buttons for quick selection. Below this, an informational account login section titled RSPRO Account Information states that the user is not currently signed in. This screen is suitably used in a limited-access context, such as a pre-authentication state or a lightweight version of the tool's setup interface. It suitably enables users to select an operational mode before logging into a user account or accessing more advanced functions, ensuring that appropriate tool behavior is established early in the session or by users with restricted access.

Figure 9:
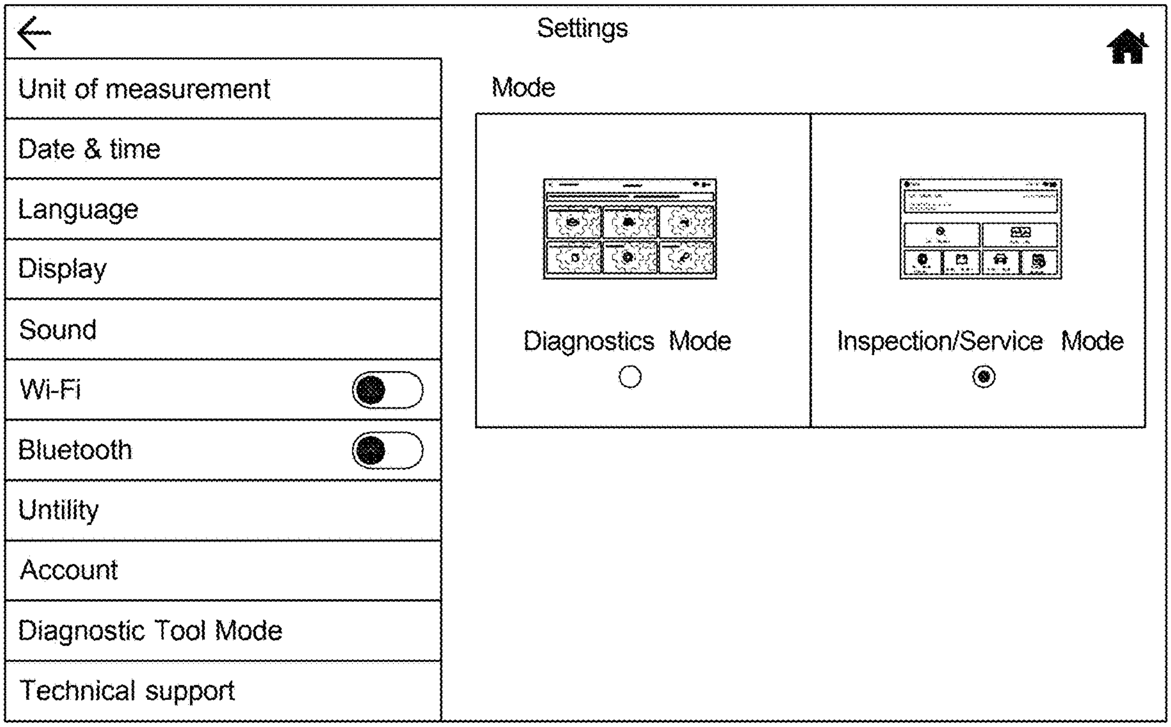
FIG. 9 presents an example of a full-featured settings interface for a for a modular automotive diagnostic platform with progressive feature unlocking.

FIG. 9 presents an example of a full-featured settings interface for a vehicle diagnostic tool, organized into a side menu with selectable categories such as Unit of Measurement, Date & Time, Language, Display, Sound, Wi-Fi, Bluetooth, Utility, Account, Diagnostic Tool Mode, and Technical Support. When the user selects the "Diagnostic Tool Mode" category, the right-hand panel displays two selectable operational profiles: Diagnostic Mode and Inspection/Service Mode. Each option is visually represented by a labeled thumbnail image showing the corresponding interface layout. Diagnostic Mode offers comprehensive access to functions like OBD-II diagnostics, OEM diagnostics, and workshop tools. Inspection/Service Mode is depicted with a simpler layout focused on routine checks such as quick diagnostics and battery testing. This version of the settings screen is visually rich and is particularly suitable for users with access to the full graphical UI and a complete suite of configuration options.

The table of FIG. 10 summarizes an example of diagnostic functions available across defined access modes, each tier building upon the previous in both capability and required authorization. These access levels reflect not only a functional hierarchy but also a set of strategic constraints grounded in licensing limitations, user qualifications, and interface design preferences. Mode 1, corresponding to the baseline Inspection/Service Mode, is intentionally limited to core diagnostic functions such as generic DTC reading and clearing, freeze frame display, and basic emissions readiness checks. Importantly, this mode does not require either VIN data or user credentialing, making it suitable for general consumers, entry-level service personnel, or situations in which minimal diagnostics are sufficient. In some cases, even professional users may choose to remain in Mode 1 to preserve a simplified, streamlined interface when advanced functions are unnecessary. Moreover, licensing models may impose limitations that restrict access to higher diagnostic tiers, such that Mode 1 remains the only available option unless a subscription or user entitlement is validated.

The table of FIG. 11 summarizes a range of modular system improvements designed to enhance the functionality, security, and adaptability of a dual-mode automotive diagnostic tool. These enhancements are organized by technical area, such as user interface, system architecture, safety, and so on. Each row identifies a functional variant, a specific added capability, and briefly describes the value it brings to the tool in practical, user-oriented terms.

For example, under User Interface, the system includes Role-Based Access with Biometric Login or Smart Badge, which automatically determines the appropriate operational mode (e.g., Entry or Pro) based on the technician's authenticated identity. This creates a secure and personalized experience by showing only the tools relevant to the user's role.

The System Architecture row outlines Mode-Specific Interface Loading, meaning each operational mode loads different sets of software components, creating structural separation. This not only helps contain complexity and prevent unauthorized use but also strengthens potential patent claims by establishing a technical distinction between modes.

Under Safety, the tool includes a Dynamic Safety Sandbox or Lockout system. This restricts hazardous or invasive functions (like activating actuators or modifying ECU settings) in Entry Mode, either through software barriers or hardware partitioning, thereby protecting users and vehicles from misuse.

In the AI Assistance category, the tool features Adaptive Mode Recommendations. This employs either machine learning or rule-based logic to suggest when to switch to a more advanced mode, based on live diagnostics like the severity of fault codes (DTCs) or system health indicators.

The Collaboration enhancement, Real-Time Dual-Mode Collaboration, allows two users, such as a service advisor and a technician, to access the same session in different modes simultaneously. This could be achieved via cloud synchronization or dual-display support, promoting team-based diagnostics.

In the area of AR/VR Integration, the tool may include an Integrated Guided Repair Mode that displays augmented reality overlays, repair videos, or visual aids in Entry Mode. This aids less experienced users in following procedures safely and accurately without requiring direct access to high-risk tools.

For Software Licensing, the tool supports Over-the-Air Mode Licensing, enabling Pro Mode to be temporarily unlocked remotely, either by subscription, job count, or a pay-per-use model. This not only adds commercial flexibility but also supports new business method claims.

From a Security/Compliance standpoint, Auditable Access Logs for Compliance ensure that each use of Pro Mode is recorded, including technician ID, vehicle VIN, and any performed actions. This supports warranty validation, legal compliance, and internal audits, especially useful in regulated or enterprise environments.

Finally, the Vehicle Detection feature, Vehicle-Side Profile Matching, tailors available functionality based on what the connected vehicle supports. For instance, the system can detect whether a car supports CAN-based communication or has specific ECU configurations, and limit or expand available diagnostics accordingly.

Mode 2, representing the Enhanced Inspection Mode, extends the functionality of Mode 1 by incorporating vehicle-specific content and enhanced data presentation once a valid VIN has been retrieved. This VIN may be entered manually by the user or automatically decoded from the vehicle's onboard systems during tool initialization. In some implementations, Mode 2 may be offered as a selectable upgrade from Mode 1, allowing the user to consciously invoke richer content when needed. In others, the transition to Mode 2 occurs automatically when VIN recognition is successful and the tool is authorized to present vehicle-specific enhancements. These may include tailored DTC definitions, OEM maintenance schedules, VIN-matched wiring diagrams, and intermediate-level network mapping. However, even with these enhancements, Mode 2 remains strictly non-invasive, no reprogramming, actuator control, or system-level changes are possible, preserving safety and compliance while elevating diagnostic accuracy.

The table illustrates how each mode incrementally expands available tool functions, based on whether VIN data and credentialed access are available. It visually conveys the system's design principle: to grant diagnostic power in alignment with user intent, entitlement, and technical safety. The inclusion of an intermediate tier (Mode 2) provides meaningful value over basic diagnostics while enforcing a hard boundary before entering full-access Mode 3, which includes bidirectional commands and high-risk procedures. This layered architecture enhances usability for diverse users while ensuring that licensing, security, and liability concerns are managed systematically.

The table of FIG. 11 summarizes a range of modular system variants designed to enhance the functionality, security, and adaptability of a dual-mode automotive diagnostic tool. These enhancements are organized by technical area, such as user interface, system architecture, safety, and so on. Each row identifies a functional variant, a specific added capability, and briefly describes the value it brings to the tool in practical, user-oriented terms.

For example, under User Interface, the system includes Role-Based Access with Biometric Login or Smart Badge, which automatically determines the appropriate operational mode (e.g., Entry or Pro) based on the technician's authenticated identity. This creates a secure and personalized experience by showing only the tools relevant to the user's role.

The System Architecture row outlines Mode-Specific Interface Loading, meaning each operational mode loads different sets of software components, creating structural separation. This not only helps contain complexity and prevent unauthorized use but also strengthens potential patent claims by establishing a technical distinction between modes.

Under Safety, the tool includes a Dynamic Safety Sandbox or Lockout system. This restricts hazardous or invasive functions (like activating actuators or modifying ECU settings) in Entry Mode, either through software barriers or hardware partitioning, thereby protecting users and vehicles from misuse.

In the AI Assistance category, the tool features Adaptive Mode Recommendations. This employs either machine learning or rule-based logic to suggest when to switch to a more advanced mode, based on live diagnostics like the severity of fault codes (DTCs) or system health indicators.

The Collaboration enhancement, Real-Time Dual-Mode Collaboration, allows two users, such as a service advisor and a technician, to access the same session in different modes simultaneously. This could be achieved via cloud synchronization or dual-display support, promoting team-based diagnostics.

In the area of AR/VR Integration, the tool may include an Integrated Guided Repair Mode that displays augmented reality overlays, repair videos, or visual aids in Entry Mode. This aids less experienced users in following procedures safely and accurately without requiring direct access to high-risk tools.

For Software Licensing, the tool supports Over-the-Air Mode Licensing, enabling Pro Mode to be temporarily unlocked remotely, either by subscription, job count, or a pay-per-use model. This not only adds commercial flexibility but also supports new business method claims.

From a Security/Compliance standpoint, Auditable Access Logs for Compliance ensure that each use of Pro Mode is recorded, including technician ID, vehicle VIN, and any performed actions. This supports warranty validation, legal compliance, and internal audits, especially useful in regulated or enterprise environments.

Finally, the Vehicle Detection feature, Vehicle-Side Profile Matching, tailors available functionality based on what the connected vehicle supports. For instance, the system can detect whether a car supports CAN-based communication or has specific ECU configurations, and limit or expand available diagnostics accordingly.

The present disclosure outlines a multi-mode diagnostic platform that offers distinct advantages over existing diagnostic tools, particularly in environments where varying levels of technical expertise must be accommodated without compromising vehicle integrity or cybersecurity. By organizing diagnostic operations into a structured, tiered-access model, the system enables a single device to safely serve both entry-level users and advanced technicians. This structure includes a default Inspection/Service Mode for routine use, an Enhanced Inspection Mode for non-invasive yet in-depth diagnostics, and a Full Diagnostic Mode for advanced, risk-bearing operations such as ECU programming, actuator testing, and immobilizer reconfiguration.

A feature of the disclosed system is its credential-based gating mechanism. High-risk functions are only accessible upon successful authentication via a secure cloud platform, ensuring that advanced operations are reserved for authorized professionals. This architecture not only minimizes the risk of misuse or accidental damage but also introduces modular provisioning, advanced diagnostic functions are instantiated dynamically and are not resident in device memory unless authorized, thereby reducing cybersecurity vulnerabilities and enhancing regulatory compliance.

In addition, the platform's technical design aligns with contemporary automotive standards and emerging best practices. It supports industry-recognized diagnostic protocols such as CAN, ISO 9141, KWP2000, and SAE J1850, and incorporates PID-based query-response logic for live data acquisition, freeze frame retrieval, and DTC analysis. Moreover, the architecture is extensible to future vehicle systems, including those protected by OEM security gateways or incorporating telematics controls.

By combining real-time cloud authentication, contextual user access control, modular software provisioning, and diagnostic workflow segmentation, the system represents a robust, scalable, and future-ready solution for modern vehicle service environments. These combined elements yield a diagnostic tool architecture that is technically grounded, practically implementable, and meaningfully distinct from prior approaches, offering clear utility, novelty, and non-obviousness in both consumer and professional diagnostic applications.

In certain example embodiments, the diagnostic system includes one or more autonomous control features that enhance safety, usability, and diagnostic efficiency. In one embodiment, the system includes an autonomous mode recommendation engine that analyzes factors such as DTC severity, the number and type of active codes, system interdependencies, and prior repair history to suggest an appropriate access mode. For example, when a high-severity DTC is detected or when multiple ECUs report faults simultaneously, the system may prompt the user to escalate from Mode 1 to Mode 2 or Mode 3, or automatically prepare advanced features for expedited access.

In another embodiment, the system includes autonomous risk-based feature suppression logic. Even within credentialed Mode 3 access, certain high-impact functions such as actuator cycling or ABS bleed commands may be disabled or delayed unless predefined safety parameters are met, such as confirmation that the vehicle is stationary, the parking brake is engaged, or that the battery voltage exceeds a threshold. This prevents inadvertent vehicle control commands that could pose safety risks during improper operating conditions.

In a further example, the system may autonomously provision features based on vehicle identification data. Upon receiving a vehicle identification number (VIN), the system cross-references stored compatibility profiles and dynamically populates the interface with features relevant to the specific vehicle's make, model, year, and installed systems. Incompatible or unavailable features may be omitted entirely, minimizing user error and streamlining the diagnostic process.

In yet another embodiment, the diagnostic system includes autonomous logging and compliance tracking functionality. The system may automatically record diagnostic session details, including the selected access mode, accessed ECUs, commands issued, and VIN-specific parameters. These logs may be stored locally or transmitted to a secure server for use in warranty tracking, regulatory compliance, or technician auditing.

Additionally, in some implementations, the system may include an autonomous safety lockout mechanism that applies conditional restrictions to certain Mode 3 functions. For instance, key programming or ECU reprogramming functions may require verification of vehicle voltage levels, user credentials, or supervisory override before execution is permitted.

Finally, the system may adapt the user interface over time based on learned user behavior. In one embodiment, the system tracks navigation patterns and usage frequency to prioritize or reorder menu elements, hide rarely used tools, and present context-sensitive guidance. This autonomous UI optimization enhances workflow efficiency and tailors the interface to the user's typical service needs.

The present disclosure is directed to specific improvements in the field of vehicle diagnostics and diagnostic tool design, implemented through a particular machine-implemented architecture. The described systems and methods are not merely directed to data analysis or access control. Instead, they improve the functioning of a diagnostic tool itself and enhance vehicle servicing workflows by introducing novel diagnostic access modes that vary in functionality and user authorization levels, combined with adaptive interface presentation, mode escalation logic, and VIN-specific tool provisioning.

These features are rooted in vehicle service technology and are necessarily tied to the operation of a physical diagnostic tool interacting with real vehicle control systems via OBD protocols. The claimed invention enables safer and more effective vehicle diagnostics by restricting access to advanced functions unless authenticated, tailoring user interface features based on user role or vehicle configuration, and autonomously adapting the tool's available capabilities based on contextual data such as the detected VIN, detected DTCs, or workflow triggers. These improvements go beyond simply applying conventional access control, they integrate with technical vehicle systems in a manner that improves the operation of the tool and the safety of vehicle diagnostics.

Further, example embodiments of the diagnostic tool as disclosed incorporate a specialized hardware-software system configured with an OBD interface, a processor executing firmware and modular diagnostic logic, and access to cloud-based resources. The disclosure includes detailed architectural descriptions and multiple example embodiments that demonstrate how the claimed systems and methods are concretely applied, yield improved machine operation, and solve specific technological problems. The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A vehicle diagnostic system that selectively enables different tiers of diagnostic functionality based on user access levels, credential-based provisioning and vehicle-specific operational context comprising:

a processor and associated memory;

a user interface including a user input and a display;

an on-board diagnostic data interface configured for data communication with a vehicle on-board diagnostic system;

the processor configured to:

control a plurality of diagnostic system service functions, initiate data communication with one or more vehicle electronic control units (ECUs) via the data interface, show, on the user interface, a plurality of selectable diagnostic access modes including at least basic access mode, an enhanced access mode, and an advanced access mode, receive a user selection of one of the basic access mode, the enhanced access mode and the advanced access mode via the user interface, enable basic diagnostic functions of the vehicle diagnostic system in accordance with a selected basic access mode, wherein the basic diagnostic functions include diagnostic data retrieval, display, reporting, or analysis functions that do not invoke actuator movement or change ECU state, verify user credentials when the enhanced access mode or the advanced access mode is selected, responsive to selection of the enhanced access mode and verification of corresponding user credentials, enable the basic diagnostic functions and obtain from a remote server an enhanced, non-invasive diagnostic resource set selected based on vehicle profile information and the verified user credentials, wherein the enhanced non-invasive diagnostic resource set supports interpretation, presentation, or analysis of diagnostic information without enabling vehicle-state-changing diagnostic functions;

responsive to selection of the advanced access mode and verification of corresponding user credentials, enable the basic diagnostic functions, the enhanced diagnostic resources, and advanced diagnostic functions by downloading, from the remote server during a current authorized diagnostic session, one or more executable software modules that enable vehicle-state-changing diagnostic functions, wherein the one or more executable software modules are not resident in executable form on the vehicle diagnostic system before verification of the corresponding user credentials, and dynamically modify the available functions within the selected access mode based on one or more of a verified user access level, contextual vehicle parameters obtained from the ECUs, or vehicle profile information, wherein the one or more executable software modules for the vehicle-state-changing diagnostic functions are provisioned only during a current authorized diagnostic session associated with the verified user credentials and the vehicle profile information, such that the vehicle-state-changing diagnostic functions are not executable outside the current authorized diagnostic session.

2. The vehicle diagnostic system of claim 1, wherein the enhanced access mode is configured to display diagnostic information in a simplified, user-friendly format suitable for general users and excludes execution of operations that affect vehicle systems, and wherein the advanced access mode is configured to enable technical users to access detailed diagnostic parameters and initiate advanced operations including one or more of system resets, actuator activation, ECU configuration, and calibration of vehicle subsystems requiring recalibration for correct vehicle operation, including one or more of steering angle sensors, ride height sensors, throttle position sensors, and tire pressure monitoring systems.

3. The vehicle diagnostic system of claim 1 wherein the data interface is wireless.

4. The vehicle diagnostic system of claim 1 wherein the data interface is wired.

5. The vehicle diagnostic system of claim 1 wherein the processor is further configured to toggle between access modes in accordance with user input received via the user interface.

6. The vehicle diagnostic system of claim 1 wherein the basic access mode functions include reading diagnostic trouble codes (DTCs), retrieving freeze frame data, and displaying live sensor data.

7. The vehicle diagnostic system of claim 6 wherein the advanced access mode functions include one or more of transmission of active control commands, initiation of actuator testing, system calibration, firmware updates or ECU reprogramming.

8. The vehicle diagnostic system of claim 6 wherein the processor is further configured to:

receive a vehicle identification number (VIN); and enable vehicle specific functions within the basic access mode, the enhanced access mode or the advanced access mode in accordance with the selected diagnostic mode and received VIN.

9. The vehicle diagnostic system of claim 6 wherein access to the advanced access mode requires remote credential verification from a cloud-based authentication server.

10. The vehicle diagnostic system of claim 8 wherein vehicle-specific diagnostic tool functions are modularly activated only if the VIN matches predefined vehicle make, model, and year compatibility profiles.

11. The vehicle diagnostic system of claim 1 wherein the system includes a mode escalation mechanism that recommends switching to a more advanced access mode based on real-time diagnostic results or repair workflow triggers.

12. A method of operating a vehicle diagnostic system in selectable tiers of diagnostic functionality based on user access levels, credential-based provisioning and vehicle-specific operational context comprising:

receiving, via a user interface, a selection of one of a basic access mode, an enhanced access mode or an advanced access mode;

initiating communication between the vehicle diagnostic system and one or more vehicle electronic control units (ECUs) via an on-board diagnostic data interface;

enabling a set of basic diagnostic functions when the basic access mode is selected, wherein the basic diagnostic functions are limited to passive data retrieval operations that do not transmit actuator commands or reconfiguration instructions;

verifying user credentials when the enhanced access mode or the advanced access mode is selected;

enabling the basic diagnostic functions and enhanced diagnostic functions when the enhanced access mode is selected and associated credentials are verified, obtaining, from a remote server, a non-invasive enhanced diagnostic resource set based on vehicle profile information and the verified user credentials, wherein the enhanced non-invasive diagnostic resource set supports interpretation, presentation, or analysis of diagnostic information without enabling vehicle-state-changing diagnostic functions enabling the basic diagnostic functions, the enhanced diagnostic functions and the advanced diagnostic functions when the advanced access mode is selected and associated credentials are verified, and downloading, installing, instantiating or provisioning one or more executable software modules for advanced diagnostic functions not resident in executable form on the vehicle diagnostic system to enable one or more vehicle state-changing diagnostic functions, which state-changing diagnostic functions are not executable outside a current authorized diagnostic session; and dynamically modifying enabled functions within the selected access mode based on one or more of a verified user credential, contextual vehicle parameters retrieved from the ECUs, including detected diagnostic codes or vehicle system states, or vehicle profile information.

13. The method of claim 12, further comprising reading a VIN and activating vehicle-specific diagnostic functions based on compatibility with stored vehicle profiles.

14. The method of claim 12, further comprising verifying user credentials with a cloud-based authentication server before enabling the advanced access mode.

15. The method of claim 13, further comprising modularly activating diagnostic functions only if the VIN corresponds to a predefined compatibility profile for make, model, and year.

16. The method of claim 14, further comprising detecting diagnostic results or workflow events and recommending a diagnostic mode switch.

17. The method of claim 14, wherein the basic diagnostic functions include reading diagnostic trouble codes (DTCs), viewing live data, and retrieving freeze frame information.

18. The method of claim 14, wherein the advanced diagnostic functions include one or more of actuator command testing, ECU configuration, firmware updating, and immobilizer or key programming.

19. A non-transitory computer-readable medium storing instructions that, when executed by a processor, cause a vehicle diagnostic system to operate in different tiers of diagnostic functionality based on user access levels and vehicle-specific operational context comprising:

display, on a user interface, a plurality of selectable diagnostic access modes, including at least a basic access mode, an enhanced access mode and an advanced access mode;

receive a user selection of either a basic access mode, an enhanced access mode or an advanced access mode via the user interface;

establish communication with one or more vehicle ECUs via an on-board diagnostic interface;

enable, in response to the selected basic access mode, a set of basic diagnostic functions limited to passive read-only operations that do not trigger actuator activity or alter ECU configuration;

verify user credentials when the enhanced access mode or the advanced access mode is selected;

responsive to selection of the enhanced access mode and verification of corresponding user credentials, enable the basic diagnostic functions and obtain, from a remote server, an enhanced non-invasive diagnostic resource set selected based on vehicle profile information and the verified user credentials, wherein the enhanced non-invasive diagnostic resource set supports interpretation, presentation, or analysis of diagnostic information without enabling vehicle-state-changing diagnostic functions;

responsive to a selection of advanced access mode and verification of corresponding user credentials, enable the basic access mode, the enhanced access mode, and a set of advanced diagnostic functions wherein one or more executable software modules for advanced diagnostic functions not resident in executable form on the vehicle diagnostic system are downloaded, installed, instantiated, or provisioned that include control commands or state-modifying instructions; and dynamically tailor the availability of diagnostic functions in the selected access mode based on one or more of a user credential verification level, and real-time data received from the ECUs, including fault severity, system readiness, or configuration metadata;

wherein the one or more executable software modules for the state-changing diagnostic functions are provisioned only during a current authorized diagnostic session associated with the verified user credentials and the vehicle profile information, such that the vehicle-state-changing diagnostic functions are not executable outside the current authorized diagnostic session.

20. The medium of claim 19, wherein the instructions further cause the system to read a VIN and enable vehicle-specific diagnostic functions in accordance with predefined compatibility profiles.

21. The medium of claim 19, wherein the instructions further cause the system to verify a user's access credentials using a cloud-based authentication service before enabling the advanced access mode.

22. The medium of claim 20, wherein the vehicle-specific functions are dynamically loaded or provisioned only upon a confirmed VIN match.

23. The medium of claim 19, wherein the system presents a mode escalation recommendation when diagnostic data or workflow triggers indicate a need for enhanced functionality.

24. The medium of claim 19, wherein the basic diagnostic functions include read-only or observational capabilities, and the advanced functions include commands that can modify ECU states or trigger actuator responses.

25. The vehicle diagnostic system of claim 1, wherein the enhanced diagnostic resource set includes one or more of enhanced diagnostic trouble code definitions, guided repair content, wiring diagrams, network topology information, OEM maintenance schedule information, technical bulletin references, software-version information, or update-status information.

26. A vehicle diagnostic system comprising:

a processor and associated memory;

a user interface including a user input and a display;

an on-board diagnostic data interface configured for data communication with one or more vehicle electronic control units (ECUs) of a vehicle; and a network interface configured for data communication with a remote server;

wherein the processor is configured to enable basic diagnostic functions comprising locally available diagnostic functions configured to retrieve, display, report, or analyze diagnostic data obtained from the vehicle via the on-board diagnostic data interface without transmitting commands that invoke actuator movement or change an ECU state, verify user credentials associated with a user of the vehicle diagnostic system; and responsive to verification of the user credentials, obtain from the remote server an enhanced non-invasive diagnostic resource set selected based on the verified user credentials and vehicle profile information, wherein the enhanced non-invasive diagnostic resource set comprises credential-controlled, vehicle-specific resources configured to support interpretation, presentation, or analysis of the diagnostic data without enabling vehicle-state-changing diagnostic functions.

* * * * *